United States Patent
Katsuramaki et al.

(10) Patent No.: US 12,347,585 B2
(45) Date of Patent: Jul. 1, 2025

(54) ARRANGEMENT JIG FOR WIRE HARNESS AND SYSTEM FOR PART MANUFACTURING

(71) Applicant: YAZAKI CORPORATION, Tokyo (JP)

(72) Inventors: Takahiko Katsuramaki, Makinohara (JP); Taku Furuta, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 656 days.

(21) Appl. No.: 17/673,750

(22) Filed: Feb. 16, 2022

(65) Prior Publication Data

US 2022/0301745 A1 Sep. 22, 2022

(30) Foreign Application Priority Data

Mar. 17, 2021 (JP) ................. 2021-043854

(51) Int. Cl.
*H01B 13/012* (2006.01)
*B60R 16/02* (2006.01)
*H01R 43/20* (2006.01)

(52) U.S. Cl.
CPC ... *H01B 13/01209* (2013.01); *B60R 16/0215* (2013.01); *H01R 43/20* (2013.01); *H01B 13/01227* (2013.01); *H01B 13/01245* (2013.01)

(58) Field of Classification Search
CPC ........ H01B 13/01209; H01B 13/01227; H01B 13/01245; H01R 43/20
See application file for complete search history.

(56) References Cited

U.S. PATENT DOCUMENTS 5,052,449 A 10/1991 Fukuda et al.
2002/0098717 A1 7/2002 Matsuda et al.
(Continued)

FOREIGN PATENT DOCUMENTS

DE 3820638 A1 12/1989
DE 102016119867 A1 4/2018
(Continued)

OTHER PUBLICATIONS

Fogt et al, "Cable Fixation Strategies for Automated Cable and Wire Harness Plugging in Electric Vehicle Manufacturing," 2024 1st International Conference on Production Technologies and Systems for E-Mobility (EPTS), Bamberg, Germany, 2024, pp. 1-6. (Year : 2024).*

*Primary Examiner* — A. Dexter Tugbang
(74) *Attorney, Agent, or Firm* — KENEALY VAIDYA LLP

(57) ABSTRACT

There are provided an arrangement jig for a wire harness and a system for part manufacturing including: a plurality of blocks having a connector receiving unit that receives connectors of a wire harness; and a retaining unit that defines and retains a mutual positional relation between the plurality of blocks. The plurality of blocks have placement forms that are selectively deformable therebetween, the placement forms including: a developed form in which the connector receiving unit corresponds to a position of the connectors in an actual arrangement shape of the wire harness; and a folded form in which the plurality of blocks are tightly assembled for a storage. The retaining unit is provided to retain the mutual positional relation between the plurality of blocks when the placement form of the plurality of blocks is in the developed form.

6 Claims, 7 Drawing Sheets

(56) References Cited

U.S. PATENT DOCUMENTS

| | | |
|---|---|---|
| 2004/0154822 A1 | 8/2004 | Matsuda et al. |
| 2004/0158413 A1 | 8/2004 | Matsuda et al. |
| 2013/0100277 A1* | 4/2013 | Prieto Loefkrantz ........................ H01B 13/01227 382/145 |
| 2020/0070749 A1* | 3/2020 | Mizuno ............... B60R 16/0215 |

FOREIGN PATENT DOCUMENTS

| | | | |
|---|---|---|---|
| JP | H03-15118 A | | 1/1991 |
| JP | 2001-1221 A | | 1/2001 |
| JP | 2003-59354 A | | 2/2003 |
| JP | 2006-019063 A | | 1/2006 |
| JP | 2006-019064 A | | 1/2006 |
| JP | 2017-152154 A | | 8/2017 |
| JP | 2018060643 A | * | 4/2018 |
| JP | 6756584 B2 | | 8/2020 |

* cited by examiner

ARRANGEMENT JIG FOR WIRE HARNESS AND SYSTEM FOR PART MANUFACTURING

CROSS-REFERENCE TO RELATED APPLICATIONS

This application is based on and claims priority under 35 USC 119 from Japanese Patent Application No. 2021-043854 filed on Mar. 17, 2021, the contents of which are incorporated herein by reference.

TECHNICAL FIELD

The present disclosure relates to an arrangement jig for wire harnesses to be mounted on a vehicle, and a system for part manufacturing using the arrangement jig.

BACKGROUND ART

Generally, a wire harness to be mounted on a vehicle, such as an automobile, is an assembly of electric wires formed by integrally bundling a large number of electric wires of various types, and has a complicated shape. The wire harness is used to connect a power source, such as an in-vehicle battery, to various electrical components on the vehicle, or to connect a plurality of electrical components to each other. The wire harness is provided with a large number of connectors to facilitate attachment and detachment at electric wire connection positions.

For example, JP2017-152154A discloses a wire harness manufacturing method and a wire harness manufacturing apparatus that can reduce a manufacturing cost when manufacturing wire harnesses of various configurations according to various required specifications.

Specifically, when a wire harness that combines a base harness of a basic specification and one or more optional harnesses of selectable options is to be formed, the specification of the base harness and specifications of the optional harnesses are specified according to order information. The wire harness is manufactured by extracting a common circuit configuration included in the specifications of the optional harnesses, incorporating the extracted common circuit configuration into the specification of the base harness, removing the common circuit configuration from the specifications of the optional harnesses to manufacture a plurality of intermediate structures based on data with a rearranged common circuit configuration, and combining these intermediate structures to obtain the wire harness.

A parts manufacturer that manufactures wire harnesses manufactures a finished wire harness that satisfies requests for a specification, quantity, a delivery date, and the like, which are determined in each case by a customer such as a vehicle manufacturer, based on these requests, and delivers the finished wire harness to the customer by the specified delivery date. The parts manufacturer manufactures various types of wire harnesses, which are managed by different part numbers depending on type, grade, destination, and the like of the vehicle, according to the requests from the vehicle manufacturer and the like. The vehicle manufacturer determines a final number of deliveries for each part number several days before the delivery date, and notifies the parts manufacturer of confirmation of the order.

In consideration of human resources, securing various manufacturing apparatus, manufacturing costs, and the like related to wire harness manufacturing, the parts manufacturer may also manufacture wire harnesses overseas other than a country where the vehicle is manufactured. However, when the parts manufacturer imports the wire harness manufactured overseas to Japan and delivers it to a customer in Japan, it takes approximately two to three weeks from a time it is shipped overseas to a time it arrives in Japan.

Therefore, the parts manufacturer considers, for example, manufacturing only wire harnesses of a main part that are common to a plurality of part numbers overseas, transporting the main part wire harnesses to Japan in advance before the final number of deliveries is confirmed, and once the final number of deliveries for each part number is confirmed, assembling the main part wire harnesses with wire harnesses of different part numbers, so as to obtain wire harnesses according to required specifications and deliver them to the vehicle manufacturer.

SUMMARY OF INVENTION

When transporting the main part wire harnesses manufactured overseas to Japan, the wire harnesses will be accommodated in a storage box for transportation and shipped or transported by land. Then, at Japanese factories, the main part wire harnesses (referred to as "common wire harness") are taken out from the delivered storage box and placed on a jig plate. By assembling the main part wire harnesses with the wire harnesses of different part numbers (referred to as "optional wire harness"), the wire harnesses of the specifications to be delivered to the customer are completed.

However, the main part wire harnesses are made of a large number of electric wires and connectors and have a complicated shape. For this reason, there arises a problem that it takes a lot of time and effort for operators to manually accommodate the harnesses in the storage box and arrange the harnesses taken out from the storage box onto the jig plate.

The present disclosure provides an arrangement jig for wire harnesses that achieves rationalization of wire harness transfer work between bases when a wire harness manufacturing process spans a plurality of bases, and a system for part manufacturing using the arrangement jig.

According to an illustrative aspect of the present disclosure, an arrangement jig for a wire harness includes: a plurality of blocks having a connector receiving unit that receives connectors of a wire harness; and a retaining unit that defines and retains a mutual positional relation between the plurality of blocks. The plurality of blocks have placement forms that are selectively deformable therebetween, the placement forms including: a developed form in which the connector receiving unit corresponds to a position of the connectors in an actual arrangement shape of the wire harness; and a folded form in which the plurality of blocks are tightly assembled for a storage. The retaining unit is provided to retain the mutual positional relation between the plurality of blocks when the placement form of the plurality of blocks is in the developed form.

The present disclosure has been briefly described as above. Further, details of the present disclosure will be clarified by reading an aspect (hereinafter, referred to as an "embodiment") for implementing the disclosure to be described below with reference to the accompanying drawings.

BRIEF DESCRIPTION OF DRAWINGS

FIGS. 1A and 1B are explanatory diagrams of a wire harness manufactured by using an arrangement jig according to an embodiment of the present disclosure, in which FIG. 1A is a perspective diagram illustrating a state in which a finished wire harness obtained by assembling a common wire harness and optional wire harnesses is arranged in a vehicle, and FIG. 1B is a diagram illustrating a distinction between the common wire harness and the optional wire harnesses.

FIGS. 2A and 2B are diagrams illustrating a configuration of the arrangement jig according to the embodiment of the present disclosure, in which FIG. 2A is a perspective diagram illustrating a state in which the arrangement jig is developed, and FIG. 2B is a perspective diagram illustrating a state in which the arrangement jig is folded.

FIGS. 4A and 4B are explanatory diagrams of the system for part manufacturing according to the embodiment of the present disclosure, in which FIG. 4A is a perspective diagram illustrating the common wire harness manufactured at the first manufacturing base and the arrangement jig in a developed form, and FIG. 4B is a perspective diagram illustrating the arrangement jig in a state before the developed form.

DESCRIPTION OF EMBODIMENTS

Specific embodiments according to the present disclosure will be described below with reference to the accompanying drawings.

Figure 1A:
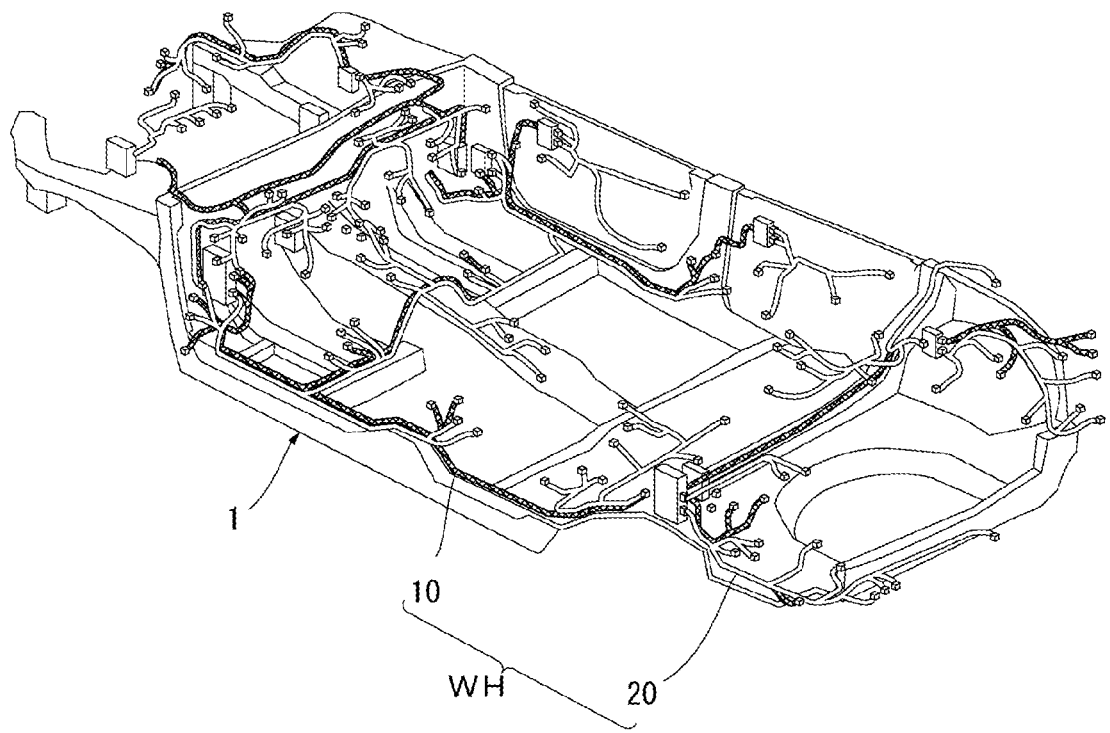
Figure 1B:
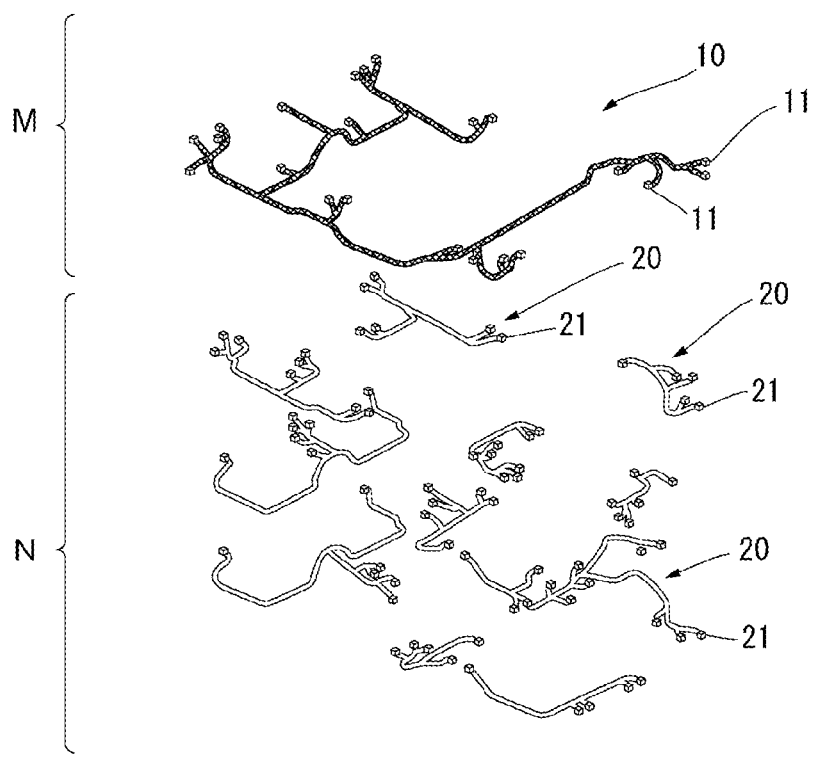

FIGS. 1A and 1B are explanatory diagrams of a wire harness manufactured by using an arrangement jig according to an embodiment of the present disclosure, in which FIG. 1A is a perspective diagram illustrating a state in which a finished wire harness obtained by assembling a common wire harness and optional wire harnesses is arranged in a vehicle, and FIG. 1B is a diagram illustrating a distinction between the common wire harness and the optional wire harnesses.

First, on the premise of using the arrangement jig (see FIGS. 2A and 2B) of the present embodiment, at a parts manufacturer that manufactures the wire harness, as shown in FIGS. 1A and 1B, the wire harnesses mounted on a vehicle 1 are roughly divided into two systems. A first system includes a wire harness as a common unit M, which is referred to here as a common wire harness 10. A second system includes a wire harness as a differentiating unit N, which is referred to here as an optional wire harness 20.

For example, a wire harness manufacturer manufactures only a main part (common unit M) of the wire harness common to a plurality of part numbers overseas, and transports the main part from overseas (a first manufacturing base) to Japan (a second manufacturing base) in advance before a final number of deliveries is confirmed. At a factory in Japan (the second manufacturing base), wire harnesses (the optional wire harnesses 20) as the differentiating unit N, which are different for each part number, are manufactured. Then, once the final number of deliveries for each part number is confirmed, the common wire harness 10 is assembled with the optional wire harnesses 20, so as to obtain wire harnesses according to required specifications (finished wire harness WH).

In such a manufacturing flow, at a stage of transporting the common wire harness 10 manufactured overseas to Japan, the wire harness is accommodated in a storage container for transportation or the like and is shipped or transported by land. The factory in Japanese performs a process such as taking out the common wire harness 10 from the delivered storage container or the like and arranging the common wire harness 10 on a jig plate. However, the common wire harness 10 is made of a large number of electric wires and connectors and thus has a complicated shape. Therefore, a process of accommodating the common wire harness 10 in the storage container or the like and a process of arranging the common wire harness 10 from the storage container or the like on the jig plate are troublesome. Especially if these processes rely on labor of workers, it will take a lot of time and effort. Therefore, automation as much as possible is desired. Therefore, the arrangement jig according to the present embodiment is used.

Figure 2A:
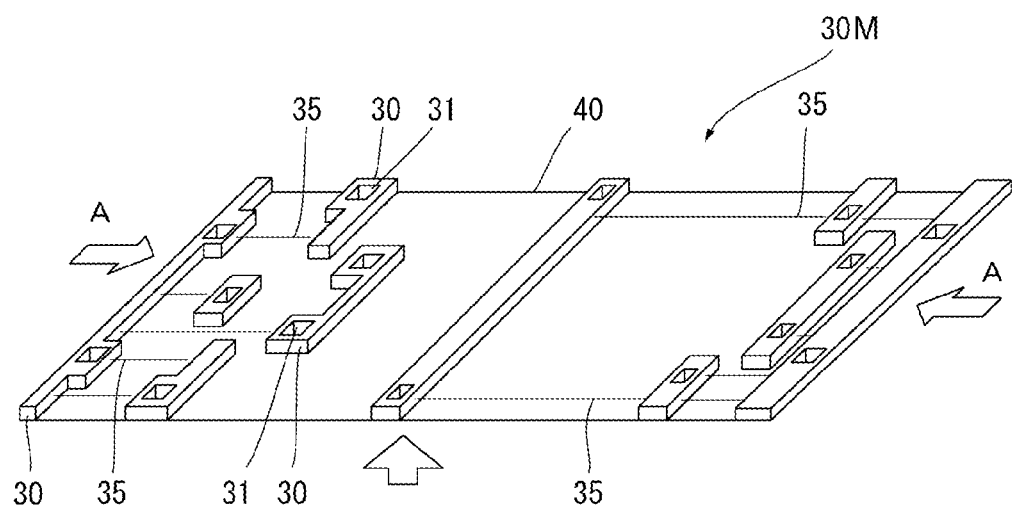
Figure 2B:
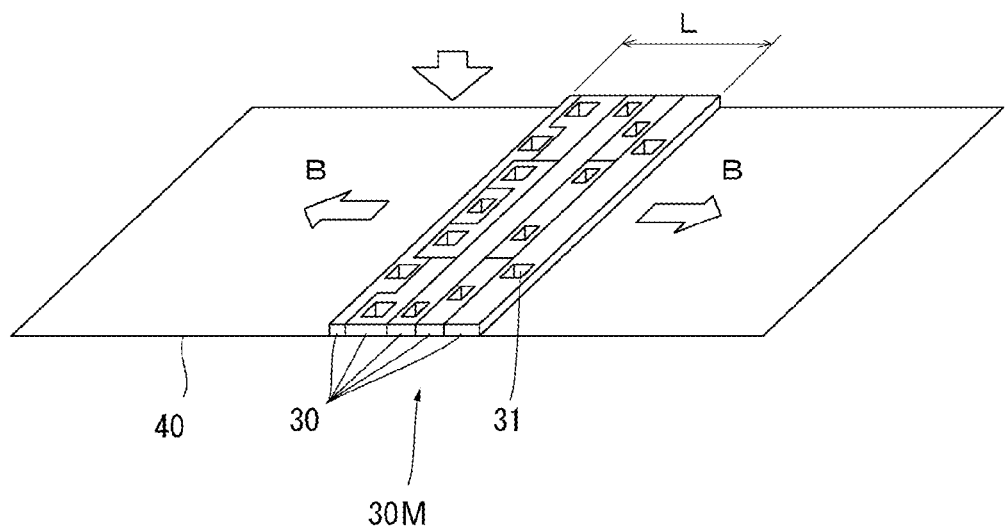

FIGS. 2A and 2B are diagrams illustrating a configuration of the arrangement jig according to the embodiment of the present disclosure, in which FIG. 2A is a perspective diagram illustrating a state in which the arrangement jig is developed, and FIG. 2B is a perspective diagram illustrating a state in which the arrangement jig is folded.

As shown in FIGS. 2A and 2B, an arrangement jig 30M includes a plurality of blocks 30 each provided with a connector receiving unit 31 that receives each connector 11 (see FIG. 1B) of the common wire harness 10. These blocks 30 are arranged, for example, in a plane on a developed table 40, and can be put together in one place or dispersed by sliding in a certain direction on the developed table 40. That is, a placement form of the plurality of blocks 30 can be selectively changed to either a developed form in which the plurality of blocks 30 are dispersed or a folded form in which the plurality of blocks 30 are tightly assembled in one place.

As shown in FIG. 2A, the developed form is a form in which each connector receiving unit 31 can correspond to a position of each connector of the wire harness in an actual arrangement shape. As shown in FIG. 2B, the folded form is a form in which the plurality of blocks 30 are tightly assembled for storage. To shift from the developed form to the folded form, the blocks 30 are slid in directions of arrows A in FIG. 2A. To shift from the folded form to the developed form, the blocks 30 are slid in directions of arrows B in FIG. 2B. The blocks 30 may be of any shape, and are preferably bar-shaped objects that are long in a direction orthogonal to a sliding direction (arrows A and B). The sliding direction can beset freely, and for example, is set so as to match a length direction (corresponding to a front-rear direction of the vehicle) of vertical and horizontal dimensions of the common wire harness 10.

The number, shape and size of the blocks 30 are optional, and are preferably set such that when the blocks 30 are in the developed form, each connector receiving unit 31 is arranged at the position of each connector of the wire harness in the actual arrangement shape, and when the blocks 30 are in the folded form, an assembled size L (an occupied dimension in the sliding direction) of the blocks 30 becomes as small as possible. For example, as shown in FIG. 2B, each block 30 has a shape in which side faces of each two adjacent blocks 30 are fitted to each other, so that the assembled size L in the folded form becomes as small as possible.

The arrangement jig 30M is also provided with a retaining unit that defines and retains a mutual positional relation between the plurality of blocks 30 so that the mutual positional relation is not broken when the placement form of the plurality of blocks 30 is set to the developed form. The arrangement jig 30M of the present embodiment includes linear connecting members 35 having a predetermined length as the retaining unit, and the plurality of blocks 30 are connected by these linear connecting members 35. The length of these connecting members 35 is set such that each connector receiving unit 31 of the plurality of blocks 30 is placed at the position of each connector 11 in the actual arrangement shape of the common wire harness 10 when the connecting members 35 are extended. As the connecting member 35, a wire, a metal wire, a tape, a string, and the like can be selected.

The arrangement jig 30M is provided with a restraining member that retains the folded form by surrounding the plurality of blocks 30 as necessary when the plurality of blocks 30 are assembled so as to be in the folded form. As the restraining member, a belt, a frame, or the like can be adopted.

By using the above-described arrangement jig 30M, the following effects can be obtained.

That is, the above-described arrangement jig 30M can change the placement form of the plurality of blocks 30 provided with the connector receiving unit 31 to either the developed form or the folded form. By being changed into the developed form, the connectors 11 of the common wire harness 10 arranged in the actual arrangement shape can be attached to the connector receiving unit 31 provided in each block 30. Therefore, when each connector 11 is retained by the block 30 respectively, even if the blocks 30 are moved, the entire common wire harness 10 can be easily returned to an original (actual) arrangement shape as long as the blocks 30 are returned to an original position (position in the developed form).

During transportation, the blocks 30 retaining the connectors 11 are tightly assembled in advance to be in the compact folded form and then stored in a storage container or the like. Therefore, a storage space can be reduced and transportation efficiency can be improved. After transportation, by changing the arrangement jig 30M taken out from the storage container from the folded form to the developed form and returning each block 30 to the original position, the connectors 11 can be returned to an original position, and a shape of the entire common wire harness 10 relative to the connectors 11 can be returned to the original arrangement shape. Therefore, it is possible to easily assemble the optional wire harnesses 20 to the common wire harness 10 that returns to the original arrangement shape.

In a folding process of the blocks 30 before transportation and a developing process of the blocks 30 after transportation, instead of manually returning the connectors 11 to the original position by an operator individually, all that is required is to move the blocks 30 retaining the connectors 11. Therefore, for example, if using an automatic machine incorporated with a sliding mechanism for the blocks 30, the folding process and the developing process can be automated without manual work of any operator, and rationalization by labor saving can be achieved.

According to the above-described arrangement jig 30M, by connecting the blocks 30 with the linear connecting members 35 as the retaining unit, a mutual position between the blocks 30 in the developed form is defined by the length of the connecting member 35. Therefore, it is possible to easily define the mutual positional relation between the blocks 30 in the developed form without incurring any member cost.

According to the above-described arrangement jig 30M, when the plurality of blocks 30 are assembled so as to be in the folded form, the side faces of each two adjacent blocks 30 are fitted to each other. Therefore, the assembled size L of the blocks 30 can be reduced, the storage space of the arrangement jig 30M can be reduced, and the transportation efficiency can be improved.

When the plurality of blocks 30 are assembled so as to be in the folded form, the plurality of blocks 30 are surrounded with the restraining member to retain the folded form, so that stabilization during storage can be achieved.

Next, a system for part manufacturing using the above-described arrangement jig 30M will be described.

This system for part manufacturing, which manufactures wire harnesses with specifications required by a customer, includes a first manufacturing base and a second manufacturing base located in different regions. At the first manufacturing base located in a region such as overseas where a manufacturing cost is low, the common wire harness 10 commonly used for a plurality of part numbers of a vehicle is manufactured and shipped to the second manufacturing base.

The second manufacturing base is located closer to a delivery place designated by the customer than the first manufacturing base, and for example, is located in Japan. At the second manufacturing base, the common wire harness 10 delivered from the first manufacturing base is received, the plurality of optional wire harnesses 20 different for each part number are assembled with the common wire harness 10 to obtain the finished wire harness WH with the specifications required by the customer, and the finished wire harness WH is delivered to the delivery place.

Figure 3:
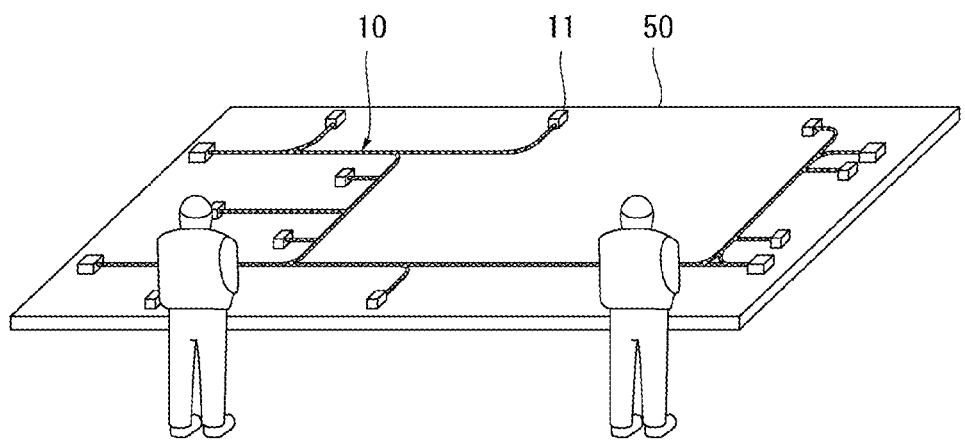
FIG. 3 is an explanatory diagram of a system for part manufacturing according to the embodiment of the present disclosure, which is a perspective diagram illustrating a state in which the common wire harness is manufactured at a first manufacturing base.
Figure 4A:
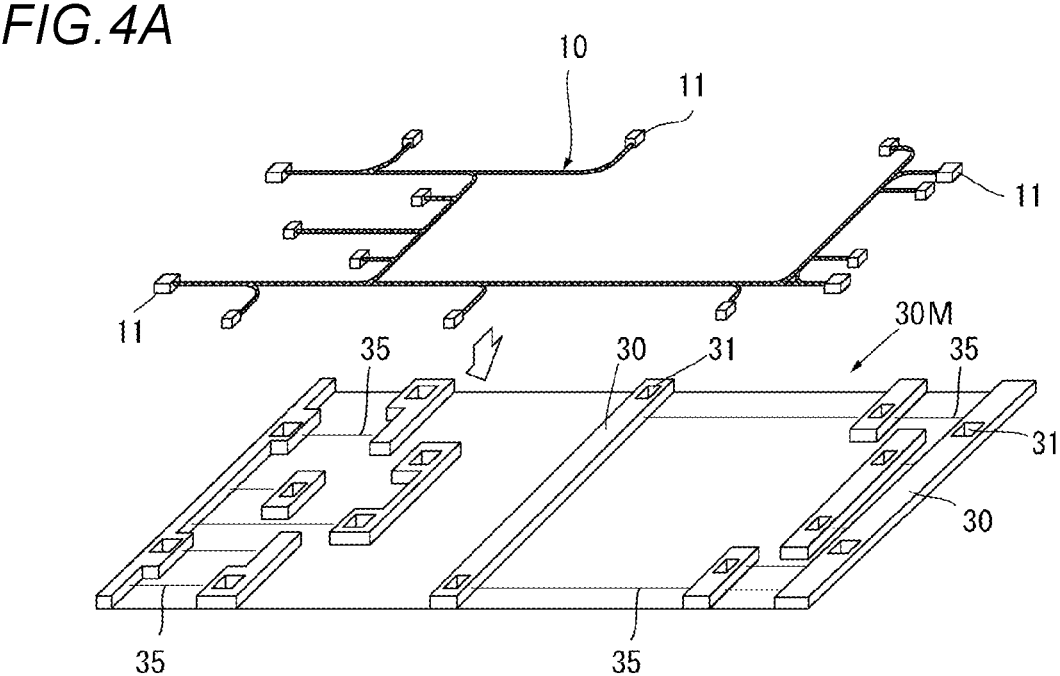
Figure 4B:
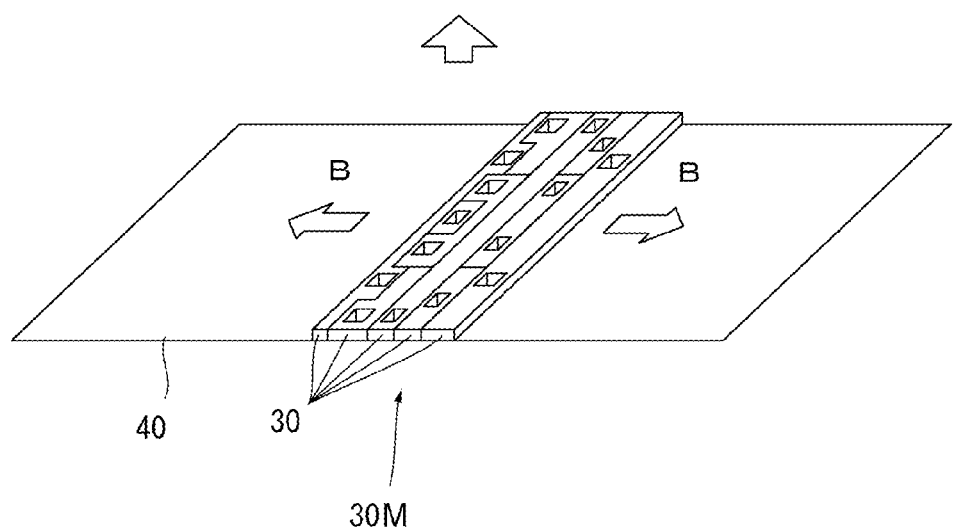
Figure 5:
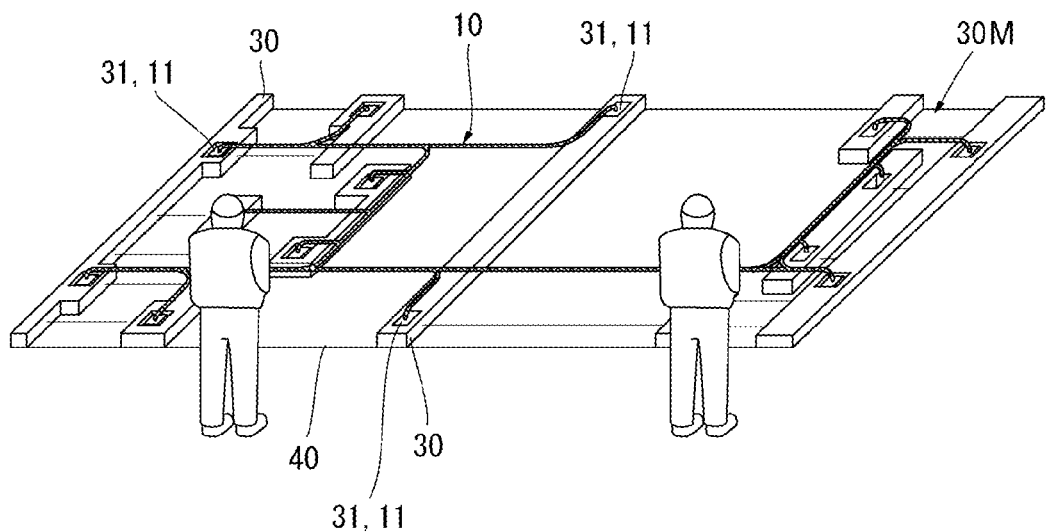
FIG. 5 is an explanatory diagram of the system for part manufacturing, which is a perspective diagram illustrating a state in which the common wire harness manufactured at the first manufacturing base is set on the developed arrangement jig.

Specifically, as shown in FIG. 3, first, the common wire harness 10 is manufactured by using an arrangement table 50 or the like at the first manufacturing base such as overseas. Next, as shown in FIGS. 4A, 4B and 5, the manufactured common wire harness 10 is set on the arrangement jig 30M in which the placement of the blocks 30 is changed from the folded form (a form in FIG. 4B) to the developed form (a form in FIG. 4A) in advance (see FIG. 5). That is, each connector 11 of the common wire harness 10 is filled into the connector receiving unit 31 of each block 30.

In this way, almost all the connectors 11 can be retained by the blocks 30. Since the connector 11 is attached to a terminal of the electric wire constituting the common wire harness 10, by retaining the connector 11 in this way, the entire common wire harness 10 is retained.

Figure 6:
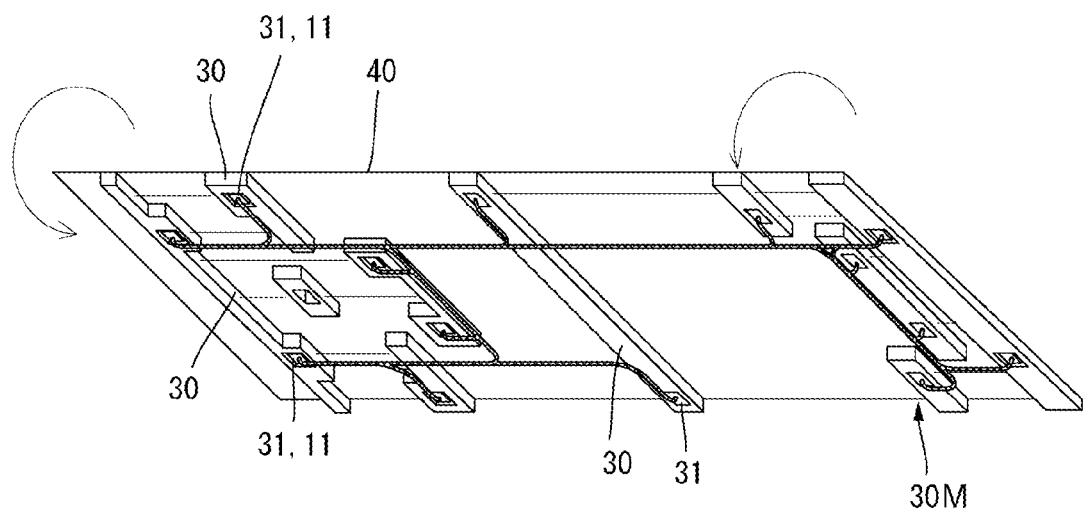
FIG. 6 is an explanatory diagram of the system for part manufacturing, which is a perspective diagram illustrating a state in which the arrangement jig is turned upside down.
Figure 7:
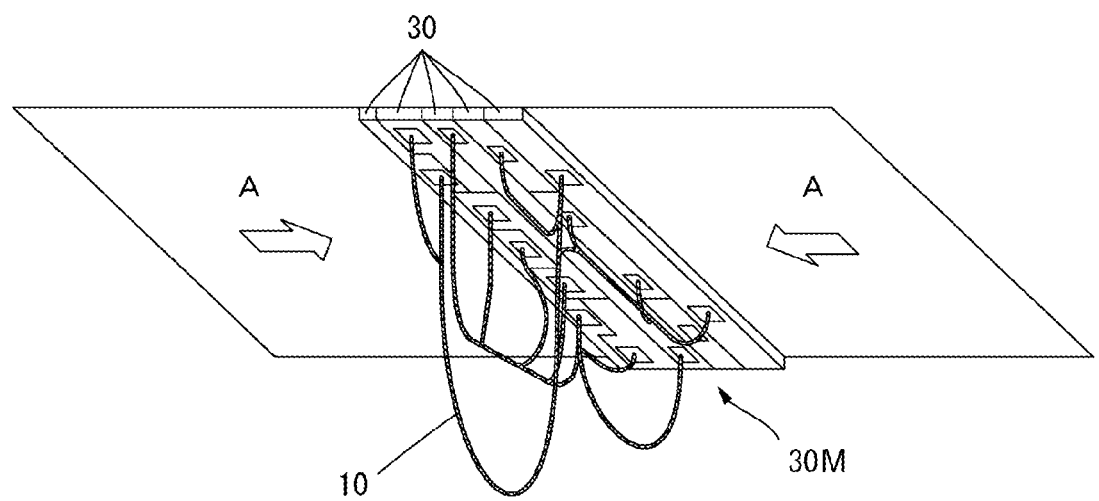
FIG. 7 is an explanatory diagram of the system for part manufacturing, which is a perspective diagram illustrating a state in which the arrangement jig turned upside down is in a folded form.
Figure 8:
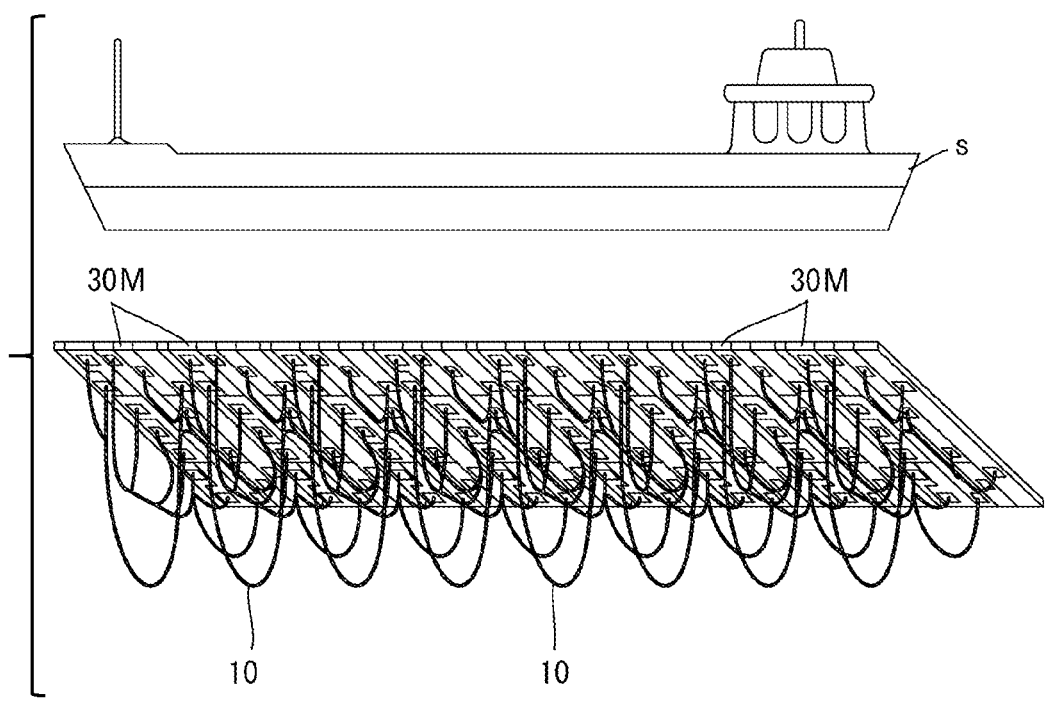
FIG. 8 is an explanatory diagram of the system for part manufacturing, which is a diagram for explaining a process of holding and storing a large number of the arrangement jigs in the folded form and the common wire harnesses for shipping and transporting.

Then, as shown in FIGS. 6 and 7, with the arrangement jig 30M turned upside down, the blocks 30 are slid to the folded form as shown by the arrows A in FIG. 7, and in the folded form, a plurality of sets are retained and stored together as shown in FIG. 8.

By sliding the blocks 30 into the folded form with the arrangement jig 30M turned upside down in this way, the electric wire connecting the connectors 11 can be made hanging downward, and there is no risk that the electric wire is sandwiched between the blocks 30. Therefore, the plurality of blocks 30 can be tightly assembled without being disturbed by the electric wire, and as a result, the assembled size of the blocks 30 can be reduced, storage efficiency of the arrangement jig 30M and the common wire harness 10 can be improved.

As described above, the arrangement jig 30M and the common wire harness 10 are retained and stored in the folded form, loaded on a ship S, and shipped to the second manufacturing base.

Figure 9:
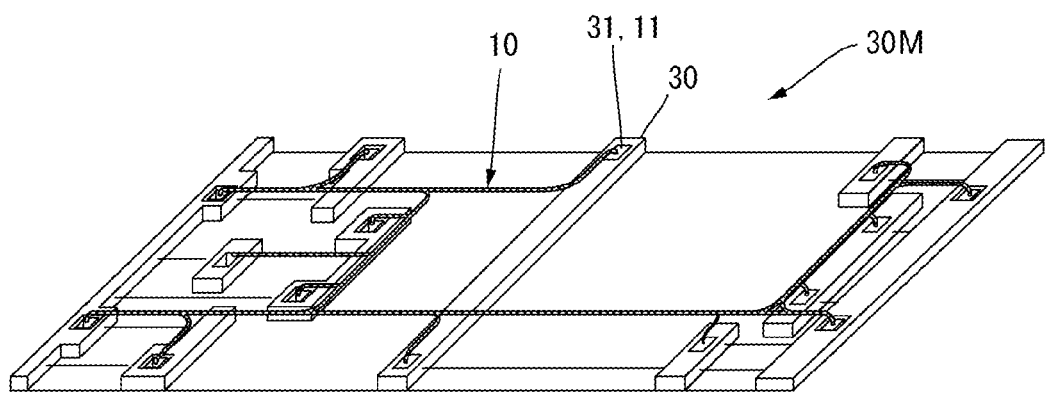
FIG. 9 is an explanatory diagram of the system for part manufacturing, which is a perspective diagram illustrating a state in which the arrangement jig is unfolded with a front side facing upward after transportation.
Figure 10:
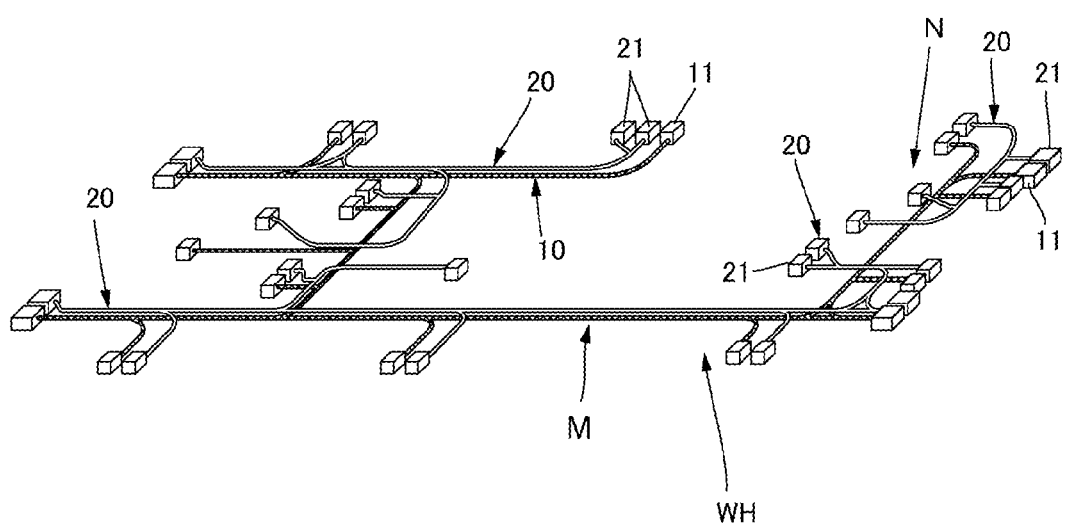
FIG. 10 is an explanatory diagram of the system for part manufacturing, which is a perspective diagram illustrating the finished wire harness obtained by assembling the common wire harness and the optional wire harnesses.

Next, at the second manufacturing base, the arrangement jig 30M in the folded form delivered from the first manufacturing base is developed so as to be in the developed form as shown in FIG. 9. Therefore, on the arrangement jig 30M in the developed form, the common wire harness 10 and the optional wire harnesses 20 are assembled to obtain the finished wire harnesses WH as shown in FIG. 10. The optional wire harnesses 20 are manufactured by using different arrangement jigs. The finished optional wire harnesses 20 may be assembled with the common wire harnesses 10 retained by the arrangement jig 30M, or the optional wire harnesses 20 may be assembled on the arrangement jig 30M and then combined with the common wire harness 10.

As described above, according to the system for part manufacturing according to the present embodiment, since the arrangement jig 30M is retained and stored in the folded form and shipped to the second manufacturing base with the common wire harness 10 manufactured at the first manufacturing base mounted on the arrangement jig 30M, the common wire harness 10 can be efficiently transported to the second manufacturing base in a compact form. At the second manufacturing base, the common wire harness 10 can be returned to the original (actual) arrangement shape by developing the arrangement jig 30M delivered from the first manufacturing base from the folded form to the developed form. Therefore, on the arrangement jig 30M, the finished wire harnesses WH can be obtained by assembling the common wire harness 10 that is returned to the original arrangement shape and the optional wire harnesses 20.

In this series of processes, in the folding process of the blocks 30 before transportation and the developing process of the blocks 30 after transportation, instead of manually returning the connectors 11 to the original position by an operator individually, all that is required is to move the blocks 30 retaining the connectors 11. Therefore, for example, by adopting an automatic machine incorporated with a sliding mechanism for the blocks 30 in the system, the folding process and the developing process of the arrangement jig 30M can be automated without manual work of any operator, and the rationalization by labor saving is achieved.

Here, features of the arrangement jig for a wire harness and the system for part manufacturing according to the embodiment of the present disclosure described above will be briefly summarized and listed in the following aspects [1] to [6].

With respect to the aspect [1], an arrangement jig (30M) for a wire harness includes: a plurality of blocks (30) having a connector receiving unit (31) that receives connectors (11) of a wire harness (10); and a retaining unit (35) that defines and retains a mutual positional relation between the plurality of blocks (30). The plurality of blocks (30) have placement forms that are selectively deformable therebetween, the placement forms including: a developed form in which the connector receiving unit (31) corresponds to a position of the connectors (11) in an actual arrangement shape of the wire harness (10); and a folded form in which the plurality of blocks (30) are tightly assembled for a storage. The retaining unit (35) is provided to retain the mutual positional relation between the plurality of blocks (30) when the placement form of the plurality of blocks (30) is in the developed form.

According to the arrangement jig for a wire harness having the configuration in the above aspect [1], the placement form of the plurality of blocks provided with the connector receiving unit can be changed to either the developed form or the folded form. When the arrangement jig is in the developed form, the connectors of the wire harness arranged in the actual arrangement shape can be attached to the connector receiving unit provided in each block. Therefore, when each connector is retained by a block, even if the blocks are moved, the entire wire harness can be easily returned to an original (actual) arrangement shape as long as the blocks are returned to an original position (position in the developed form).

During transportation, the blocks retaining the connectors are tightly assembled in advance to be in the compact folded form and then stored in a storage container or the like. Therefore, a storage space can be reduced and transportation efficiency can be improved. After transportation, by changing the arrangement jig taken out from the storage container from the folded form to the developed form and returning each block to the original position, the connectors can be returned to an original position, and the shape of the entire wire harness relative to the connectors can be returned to the original arrangement shape. Therefore, it is possible to easily assemble other wire harnesses to the wire harness that returns to the original arrangement shape.

In a folding process of the blocks before transportation and a developing process of the blocks after transportation, instead of manually returning the connectors to the original position by an operator individually, all that is required is to move the blocks retaining the connectors. Therefore, for example, by using an automatic machine incorporated with a sliding mechanism for the blocks, the folding process and the developing process can be automated without manual work of any operator, and rationalization by labor saving is achieved.

With respect to the aspect [2] according to the above aspect [1], the retaining unit (35) includes a linear connecting member (35) having a predetermined length. The plurality of blocks (30) are connected via the connecting member (35). The length of the connecting member (35) is set such that connector receiving unit (31) of the plurality of blocks (30) is placed at the position of connectors (11) in the actual arrangement shape of the wire harness (10) when the connecting member (35) is extended.

According to the arrangement jig for a wire harness having the configuration in the above aspect [2], by connecting the blocks with the linear connecting member as the retaining unit, mutual positions of the blocks in the developed form are defined by the length of the connecting member. Therefore, it is possible to easily define the mutual positional relation between the blocks in the developed form without incurring any member cost.

With respect to the aspect [3] according to the above aspect [1] or [2], a shape of each of the blocks (30) is set such that side faces of the adjacent blocks (30) are fitted to each other when the plurality of blocks (30) are in the folded form.

According to the arrangement jig for a wire harness having the configuration in the above aspect [3], when the plurality of blocks are assembled so as to be in the folded form, the side faces of each two adjacent blocks are fitted to each other. Therefore, an assembled size of the blocks can be reduced, the storage space of the arrangement jig can be reduced, and the transportation efficiency can be improved.

With respect to the aspect [4] according to any one of the above aspects [1] to [3], the arrangement jig (30M) further includes: a restraining member that surrounds the plurality of blocks (30) to retain the folded form when the plurality of blocks (30) are assembled in the folded form.

According to the arrangement jig for a wire harness having the configuration in the above aspect [4], when the plurality of blocks are assembled so as to be in the folded form, the plurality of blocks are surrounded with the restraining member to retain the folded form. Therefore, stabilization during storage can be achieved.

With respect to the aspect [5], a system for part manufacturing usable for a parts manufacturer that manufactures a wire harness (WH) includes: a first manufacturing base; and a second manufacturing base arranged in a different region from the first manufacturing base. The first manufacturing base has a function of manufacturing a common wire harness (10) commonly used for part numbers of a vehicle. The second manufacturing base is located closer to a delivery place designated by a customer than the first manufacturing base. The second manufacturing base has a function of acquiring the common wire harness (10) from the first manufacturing base, and delivering a finished wire harness (WH) to the delivery place, the finished wire harness being configured by assembling a plurality of optional wire harnesses (20) different for each of the parts number with the common wire harness (10). At the first manufacturing base, with the common wire harness (10) mounted on the arrangement jig (30M) according to any one of the aspects [1] to [4], the arrangement jig (30M) is retained and stored in the folded form and shipped to the second manufacturing base. At the second manufacturing base, the arrangement jig (30M) in the folded form delivered from the first manufacturing base is developed to be in the developed form, and then the finished wire harness (WH) is obtained by assembling the common wire harness (10) and the optional wire harnesses (20) on the arrangement jig (30M) in the developed form.

According to the system for part manufacturing having the configuration in the above aspect [5], since the arrangement jig is retained and stored in the folded form and shipped to the second manufacturing base with the common wire harness manufactured at the first manufacturing base mounted on the arrangement jig, the common wire harness can be efficiently transported to the second manufacturing base in a compact form. At the second manufacturing base, the common wire harness can be returned to the original (actual) arrangement shape by developing the arrangement jig delivered from the first manufacturing base from the folded form to the developed form. Therefore, on the arrangement jig, the finished wire harnesses can be obtained by assembling the common wire harness that is returned to the original arrangement shape and the optional wire harnesses.

In this series of processes, in the folding process of the blocks before transportation and the developing process of the blocks after transportation, instead of manually returning the connectors to the original position by an operator individually, all that is required is to move the blocks retaining the connectors. Therefore, for example, by using an automatic machine incorporated with a sliding mechanism for the blocks, the folding process and the developing process of the arrangement jig can be automated without manual work of any operator, and the rationalization by labor saving is achieved.

With respect to the aspect [6] according to the above aspect [5], at the first manufacturing base, the arrangement jig (30M) is retained and stored in the folded form in a state of being turned upside down.

According to the system for part manufacturing having the configuration in the above aspect [6], at the first manufacturing base, since the arrangement jig is retained and stored in the folded form with the arrangement jig turned upside down, although the connectors are retained by the blocks, electric wires connecting the connectors can be supported in a state of hanging downward. Therefore, there is no risk that the electric wires are sandwiched between the blocks, and the plurality of blocks can be tightly assembled without being disturbed by the electric wires. Therefore, the assembled size of the blocks can be reduced, storage efficiency of the arrangement jig and the common wire harness can be improved.

According to the present disclosure, when a wire harness manufacturing process spans a plurality of bases, rationalization of wire harness transfer work between the bases can be achieved.

What is claimed is:

1. An arrangement jig for a wire harness, comprising:
a plurality of blocks having a connector receiving unit that is configured to receive connectors of a wire harness so that each connector is filled into the connector receiving unit of a respective one of the blocks; and
a retaining unit that defines and retains a mutual positional relation between the plurality of blocks, wherein
the plurality of blocks have placement forms that are selectively deformable therebetween, the placement forms including: a developed form in which the connector receiving unit corresponds to a position of the connectors in an actual arrangement shape of the wire harness; and a folded form in which the plurality of blocks are tightly assembled for a storage, and
the retaining unit is provided to retain the mutual positional relation between the plurality of blocks when the placement form of the plurality of blocks is in the developed form, wherein
the retaining unit includes a linear connecting member having a predetermined length,
the plurality of blocks are connected via the linear connecting member, and
the predetermined length of the linear connecting member is set such that the connector receiving unit of the plurality of blocks is placed at the position of connectors in the actual arrangement shape of the wire harness when the linear connecting member is extended.

2. The arrangement jig for a wire harness according to claim 1, further comprising:

a restraining member that surrounds the plurality of blocks to retain the folded form when the plurality of blocks are assembled in the folded form.

3. An arrangement jig for a wire harness comprising:

a plurality of blocks having a connector receiving unit that is configured to receive receives connectors of a wire harness so that each connector is filled into the connector receiving unit of a respective one of the blocks; and a retaining unit that defines and retains a mutual positional relation between the plurality of blocks, wherein the plurality of blocks have placement forms that are selectively deformable therebetween, the placement forms including: a developed form in which the connector receiving unit corresponds to a position of the connectors in an actual arrangement shape of the wire harness; and a folded form in which the plurality of blocks are tightly assembled for a storage, and the retaining unit is provided to retain the mutual positional relation between the plurality of blocks when the placement form of the plurality of blocks is in the developed form, wherein a shape of each of the blocks is set such that side faces of adjacent blocks are fitted to each other when the plurality of blocks are in the folded form.

4. The arrangement jig for a wire harness according to claim 3, further comprising:

a restraining member that surrounds the plurality of blocks to retain the folded form when the plurality of blocks are assembled in the folded form.

5. A system for part manufacturing usable for a parts manufacturer that manufactures a wire harness and using an arrangement jig for a wire harness, the arrangement jig including:

a plurality of blocks having a connector receiving unit that receives connectors of a wire harness; and a retaining unit that defines and retains a mutual positional relation between the plurality of blocks, wherein the plurality of blocks have placement forms that are selectively deformable therebetween, the placement forms including: a developed form in which the connector receiving unit corresponds to a position of the connectors in an actual arrangement shape of the wire harness; and a folded form in which the plurality of blocks are tightly assembled for a storage, and the retaining unit is provided to retain the mutual positional relation between the plurality of blocks when the placement form of the plurality of blocks is in the developed form, the system comprising:

a first manufacturing base; and a second manufacturing base arranged in a different region from the first manufacturing base, wherein the first manufacturing base has a function of manufacturing a common wire harness commonly used for part numbers of a vehicle, the second manufacturing base is located closer to a delivery place designated by a customer than the first manufacturing base, the second manufacturing base has a function of acquiring the common wire harness from the first manufacturing base, and delivering a finished wire harness to the delivery place, the finished wire harness being configured by assembling a plurality of additional wire harnesses different for each of the parts number with the common wire harness, at the first manufacturing base, with the common wire harness mounted on the arrangement jig, the arrangement jig is retained and stored in the folded form and shipped to the second manufacturing base, and at the second manufacturing base, the arrangement jig in the folded form delivered from the first manufacturing base is developed to be in the developed form, and then the finished wire harness is obtained by assembling the common wire harness and the additional wire harnesses on the arrangement jig in the developed form.

6. The system for part manufacturing according to claim 5, wherein at the first manufacturing base, the arrangement jig is retained and stored in the folded form in a state of being turned upside down.

* * * * *